(12) United States Patent
Iwamoto et al.

(10) Patent No.: US 8,459,715 B2
(45) Date of Patent: Jun. 11, 2013

(54) BOX SUPPORT STRUCTURE FOR INSTRUMENT PANEL

(75) Inventors: Kazuhito Iwamoto, Hamamatsu (JP); Kenzaburo Azuma, Hamamatsu (JP)

(73) Assignee: Suzuki Motor Corporation (JP)

( * ) Notice: Subject to any disclaimer, the term of this patent is extended or adjusted under 35 U.S.C. 154(b) by 119 days.

(21) Appl. No.: 13/285,707

(22) Filed: Oct. 31, 2011

(65) Prior Publication Data
US 2012/0112488 A1    May 10, 2012

(30) Foreign Application Priority Data
Nov. 10, 2010  (JP) ................................ 2010-251581

(51) Int. Cl.
*B60R 7/06*  (2006.01)

(52) U.S. Cl.
USPC ........................................ 296/37.12; 296/70

(58) Field of Classification Search
USPC ........ 296/193.02, 70, 72, 37.8, 37.12; 180/90
See application file for complete search history.

(56) References Cited

U.S. PATENT DOCUMENTS

| | | | | |
|---|---|---|---|---|
| 6,152,512 A | * | 11/2000 | Brown et al. | 296/37.12 |
| 6,786,524 B2 | * | 9/2004 | Tamura | 296/37.12 |
| 7,416,212 B2 | * | 8/2008 | Iwasaki | 280/752 |
| 7,862,096 B2 | * | 1/2011 | Kim et al. | 296/37.12 |
| 2005/0116449 A1 | * | 6/2005 | Enders | 280/730.1 |
| 2011/0187145 A1 | * | 8/2011 | Ishikawa | 296/37.12 |
| 2012/0112488 A1 | * | 5/2012 | Iwamoto et al. | 296/37.12 |
| 2012/0139283 A1 | * | 6/2012 | Ono et al. | 296/70 |

FOREIGN PATENT DOCUMENTS

| | | |
|---|---|---|
| JP | 4015512 | 4/2004 |
| JP | 2005-145131 | 6/2005 |
| JP | 2012-76617 | * 4/2012 |
| JP | 2012-210846 | * 11/2012 |

* cited by examiner

*Primary Examiner* — Glenn Dayoan
*Assistant Examiner* — Gregory Blankenship
(74) *Attorney, Agent, or Firm* — Myers Bigel Sibley & Sajovec, P.A.

(57) ABSTRACT

An engaging portion 11 provided at an article storage box 10 pivotally engages with an axle portion 7 provided at a peripheral edge portion 4S of an opening 4 of an instrument panel 1 so that the article storage box 10 can swing so as to be switchable between a closed state and an opened state. The article storage box 10 includes a box body 20 and a lid 30. The engaging portion 11 is provided at one of the box body 20 and the lid 30, and a support portion 27 receiving and supporting the engaging portion 11 on a side of the engaging portion 11 opposite to a side of the engaging portion 11 on which a force applied from the axle portion 7 to the engaging portion 11 is exerted is provided at the other of the box body 20 and the lid 30.

5 Claims, 6 Drawing Sheets

BOX SUPPORT STRUCTURE FOR INSTRUMENT PANEL

CROSS-RELATED APPLICATIONS

This application claims priority from Japanese Patent Application No. 2010-251581; filed Nov. 10, 2010, the disclosure of which is incorporated herein by reference in its entirety.

BACKGROUND OF THE INVENTION

The present invention relates to a box support structure for an instrument panel, in which an engaging portion provided at an article storage box pivotally engages with an axle portion provided at a peripheral edge portion of an opening of the instrument panel so that the article storage box can swing with reference to an axis of the axle portion so as to be switchable between a closed state in which the article storage box is housed in the opening, and an opened state in which the article storage box projects from the opening, the article storage box including a box body and a lid attached to the box body, the lid closing the opening in the closed state.

An article storage box such as a glove box includes two parts, i.e., a box body and a lid, for hiding a lock mechanism for locking the article storage box in the closed state at a peripheral edge portion of an opening of an instrument panel and ensuring the rigidity of the lid.

In the aforementioned box support structure for the instrument panel including such article storage box, the weight of the article storage box itself and the load of an article therein are applied to the instrument panel-side axle portion via the engaging portion, and thus, the axle portion is required to have high rigidity and strength. Furthermore, a force is applied from the axle portion to the engaging portion, and thus, the engaging portion is also required to have high rigidity and strength.

Therefore, conventionally, there have been developed a technique, such as disclosed in JP 4015512 B, in which a connection rib connecting a center portion in an axis direction of an axle portion and a peripheral edge portion of an opening of an instrument panel is provided and a slit is formed in an engaging portion to allow the axle portion to enter the slit when the glove box is in a closed state, and a technique, such as disclosed in JP 2005-145131 A, in which a grid-like reinforcing rib is provided at an engaging portion.

However, in the technique disclosed in JP 4015512 B, as a result of providing a connecting rib for connecting a center portion in an axis direction of an axle portion and a peripheral edge portion of an opening of an instrument panel, the structure around the axle portion is complicated, requiring a slide mold and consequently increasing the cost of the mold. In addition, since the structure around the axle portion becomes large, the structure of the peripheral edge portion of the opening of the instrument panel also becomes large.

Meanwhile, the technique disclosed in JP 2005-145131 A, as a result of providing a rib-like reinforcing rib at an engaging portion, the structure of the engaging portion is complicated, requiring a slide mold and consequently increasing the cost of the mold as with the technique disclosed in JP 4015512 B.

SUMMARY OF THE INVENTION

The present invention has been made in view of the aforementioned circumstances, and an object of the present invention is to provide a box support structure for an instrument panel, which enables enhancement of the durability of an engagement structure including an axle portion provided at a peripheral edge portion of an opening of the instrument panel and an engaging portion provided at an article storage box, reduction of the cost of a mold by means of simplification of the engagement structure, and reduction of the size of the peripheral edge portion of the opening.

The present invention provides a box support structure for an instrument panel, in which an engaging portion provided at an article storage box pivotally engages with an axle portion provided at a peripheral edge portion of an opening of the instrument panel so that the article storage box can swing with reference to an axis of the axle portion so as to be switchable between a closed state in which the article storage box is housed in the opening and an opened state in which the article storage box projects from the opening, the article storage box including a box body and a lid attached to the box body, the lid closing the opening in the closed state, wherein: the engaging portion is provided at one of the box body and the lid; and a support portion receiving and supporting the engaging portion on a side of the engaging portion opposite to a side of the engaging portion on which a force applied from the axle portion to the engaging portion is exerted is provided at the other of the box body and the lid.

In the above configuration, the engaging portion is provided at one of the box body and the lid, and the support portion receiving and supporting the engaging portion on a side of the engaging portion opposite to a side of the engaging portion on which a force applied from the axle portion to the engaging portion is exerted is provided at the other of the box body and the lid. Thus, the engaging portion can be received and supported by the support portion, enabling enhancement of the rigidity and strength of an engagement structure including the axle portion and the engaging portion and thus enabling improvement of the durability of the engagement structure.

Furthermore, since the engaging portion is provided at one of the box body and the lid while the support portion is provided at the other of the box body and the lid, the structure of the box body or the lid provided with the engaging portion can be simplified compared to a structure in which an engaging portion is provided with a reinforcing portion such as a rib, enabling simplification of a mold for the box body or the lid as well as reduction in the cost of the mold.

As stated above, the rigidity and strength of the engagement structure can be enhanced, and thus, an increase in the size of the axle portion can be avoided, enabling reduction of the size of the peripheral edge portion of the opening of the instrument panel at which the axle portion is provided.

In the present invention, the axle portion is provided on a lower side of the peripheral edge portion of the opening of the instrument panel, the axle portion having a transversely elongated shape extending along a width direction of a vehicle; the box body includes a vertically extending back wall and a bottom wall; a lower end portion of the lid is arranged below the bottom wall; the engaging portion is provided at the lower end portion of the lid; and the support portion is provided so as to project from an outer surface of a corner portion formed by the back wall and the bottom wall. Therefore, the following effects can be provided.

The weights of the box body and the lid themselves and/or the load of an article stored in the box body are applied to the axle portion. Furthermore, an upward force is applied from the axle portion to the engaging portion. The engaging portion is received and supported by the support portion on the upper side of the engaging portion, thereby suppressing upward deformation and movement of the engaging portion.

The corner portion formed by a vertically extending back wall and a bottom wall of the box body has high rigidity and strength compared to the other portions of the box body. The support portion is provided so as to project from the outer surface of such a corner portion with high rigidity and strength, and thus, the rigidity and strength of the support portion can be enhanced, enabling enhancement of the rigidity and strength of the engagement structure. Accordingly, the engaging portion and the axle portion can be made to resist deformation even when an article is stored in the box body or when heat is applied to the box body.

In the present invention, the engaging portion has a C-shape in a cross section; and the support portion receives and supports a back portion of the engaging portion on a side of the engaging portion opposite to an open portion of the engaging portion across an axis of the engaging portion. Consequently, the structure of the engaging portion can be simplified, enabling further simplification of the engagement structure. Furthermore, the axle portion is inserted into the open portion of the engaging portion to engage the engaging portion with the axle portion, enabling the engagement work to be performed smoothly.

In the present invention, the support portion includes multiple ribs provided so as to project from the outer surface of the corner portion, the multiple ribs being mutually spaced in a width direction of the box body. Consequently, the following effects can be provided.

Since the ribs require only a small space, the ribs can easily be arranged at a narrow and complex space such as a space around the lower side of the peripheral edge portion of the opening of the instrument panel. Furthermore, since the support portion includes ribs, the mold for the box body can have a simple shape.

In the present invention, the support portion is spaced from the engaging portion in a state before the article storage box is assembled to the instrument panel, in which the engaging portion is not engaged with the axle portion; and the support portion abuts the engaging portion via a weight of the box body itself, or the weight of the box body itself plus a load of an article stored therein in a state after the article storage box is assembled to the instrument panel, in which the engaging portion is engaged with the axle portion. Therefore, the following effects can be provided.

In the state before the article storage box is assembled to the instrument panel, in which the engaging portion is not engaged with the axle portion, the support portion is spaced from the engaging portion, and thus, interference between the support portion and the engaging portion in assembling the lid and the box can be prevented, facilitating easy assembly and thus enhancing the assemblability.

In the state after the article storage box being assembled to the instrument panel, in which the engaging portion is engaged with the axle portion, the support portion abuts the at least one of the engaging portion as a result of elastic deformation of the bottom wall of the box body and the lower end portion of the lid due to a weight of the box body itself or the weight of the box body itself plus a load of an article stored therein.

The present invention enables provision of a box support structure for an instrument panel, which enables enhancement of the durability of an engagement structure including an axle portion provided at a peripheral edge portion of an opening of the instrument panel and an engaging portion provided at an article storage box, reduction in the cost of a mold by means of simplification of the engagement structure, and reduction in the size of the peripheral edge portion of the opening.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
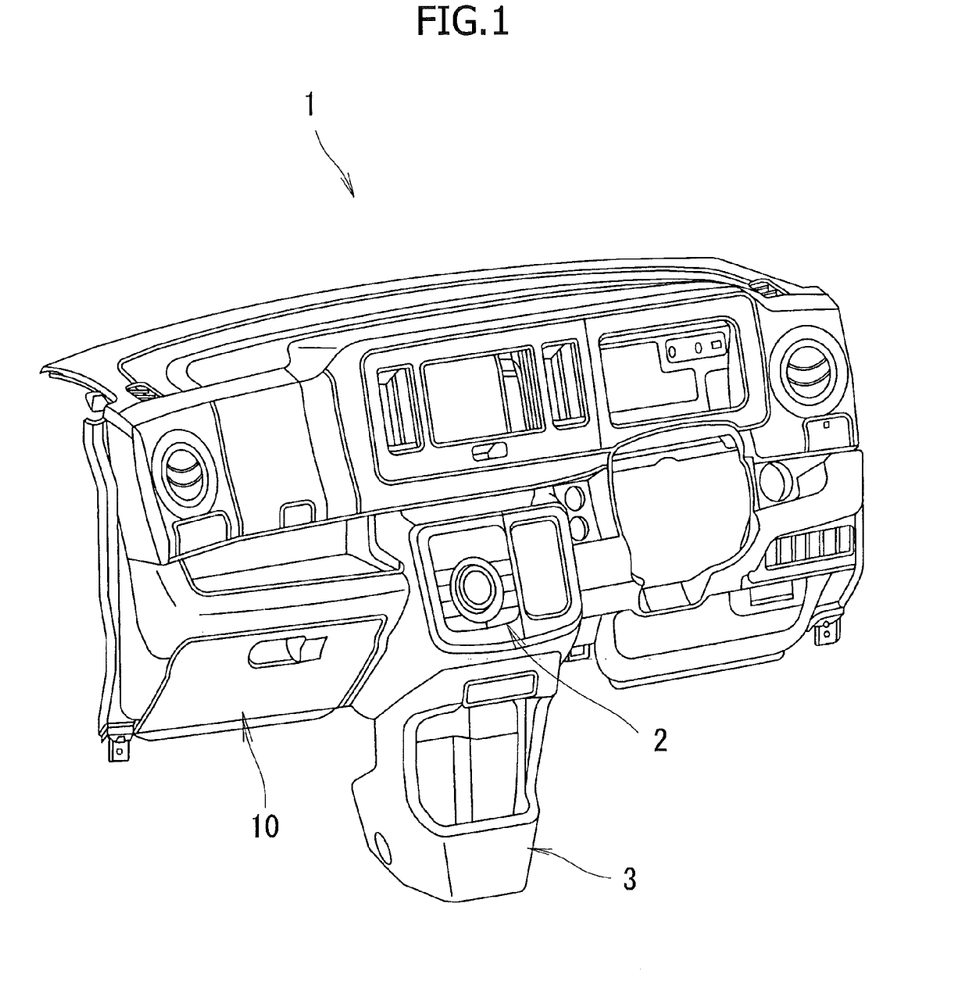
FIG. 1 is a perspective view of an instrument panel according to an embodiment of the present invention.
Figure 2:
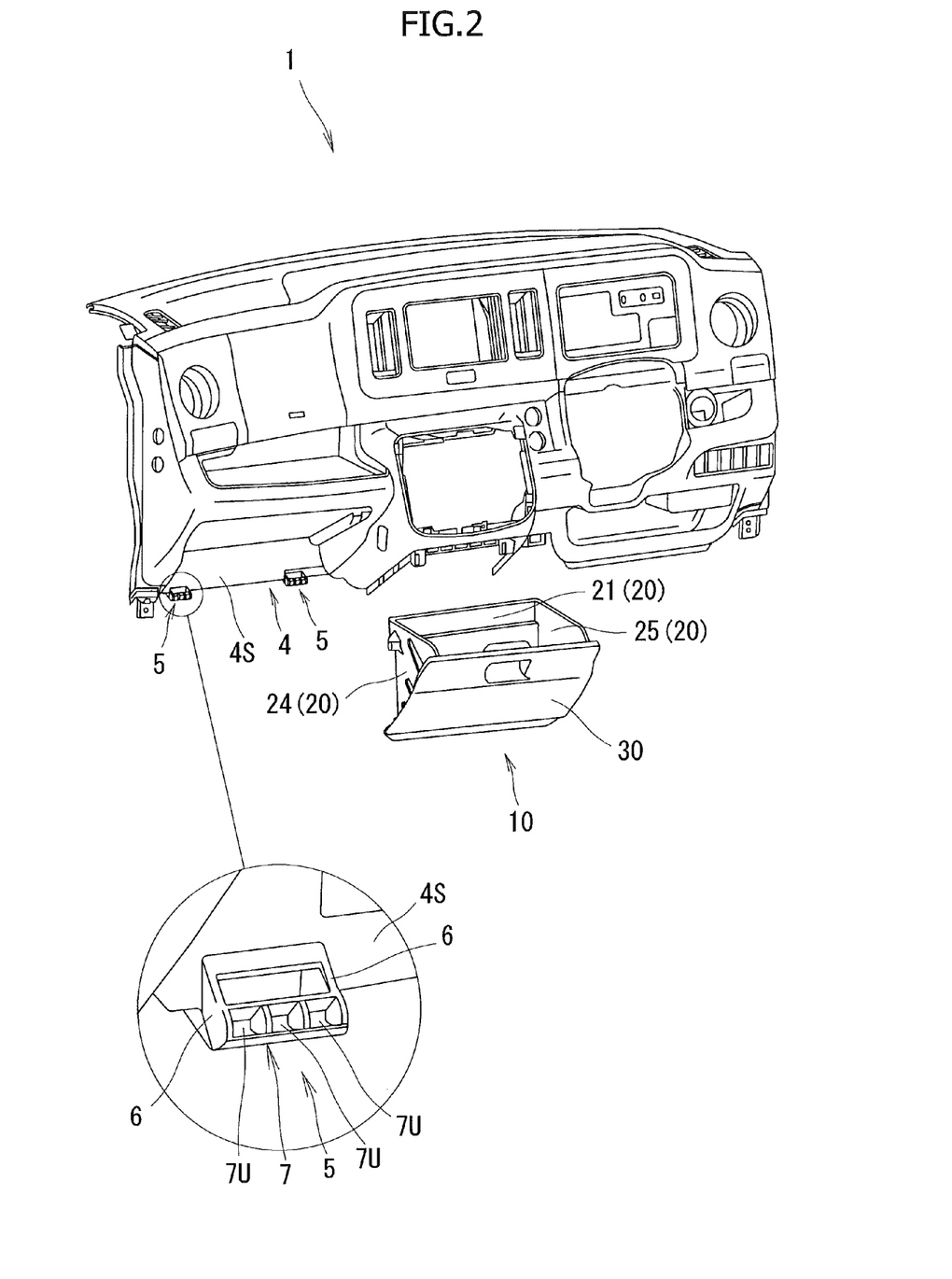
FIG. 2 is an exploded perspective view of an instrument panel according to an embodiment of the present invention.

FIGS. 1 and 2 illustrate an instrument panel 1 for an automotive vehicle. The instrument panel 1 is provided in front of a driver's seat and a front passenger seat. The instrument panel 1 includes a synthetic resin and has a length extending over substantially an entire width of an interior space of the vehicle.

Control panels 2 such as those for a car stereo system (audio equipment) and an air conditioner are collectively arranged at a center portion of the instrument panel 1 in the width direction of the vehicle. A center console 3 extends below a lower end portion of the center portion of the instrument panel 1 in the width direction of the vehicle.

As illustrated in FIG. 2, an opening 4, which has a rectangular shape directed toward the lower rear side of the vehicle, is provided below a portion of the instrument panel 1 facing the front passenger seat, and a pair of transversely arranged connection portions 5 for connecting a glove box 10 (corresponding to an article storage box) is provided at a lower side of a peripheral edge portion 4S of the opening 4.

Each connection portion 5 includes a pair of transversely arranged support pieces 6 projecting toward the lower rear side of the vehicle from the lower side of the peripheral edge portion 4S of the opening 4, and an axle portion 7, opposite ends of which are both supported by the lower side of the peripheral edge portion 4S of the opening 4 via the pair of the support pieces 6. The axle portion 7 is provided at the lower side of the peripheral edge portion 4S of the opening 4 and has a vertically elongated shape extending along the width direction of the vehicle.

Figure 5:
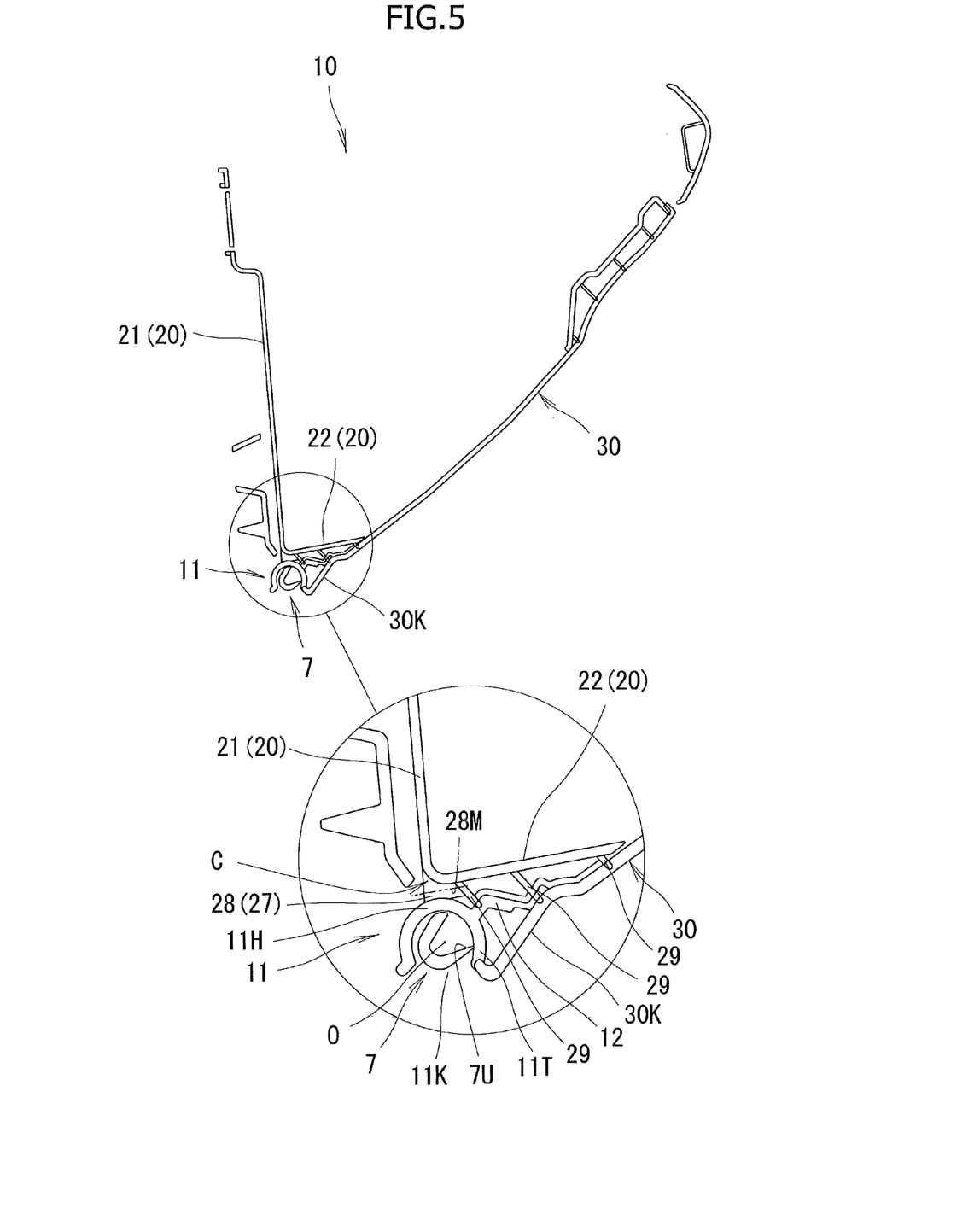
FIG. 5 is a vertical cross-sectional side view of a box support structure for an instrument panel according to an embodiment of the present invention.

The axle portion 7 includes multiple transversely elongated recess portions 7U, which each open in an upper rear direction of the vehicle, arranged in an axis direction of the axle portion 7. As illustrated in FIG. 5, each of the recess portions 7U has a trapezoidal shape widening toward the opening side in a cross section taken along a direction orthogonal to the direction in which the axle portion 7 extends. Such recess portions 7U enable reduction in the weight of the axle portion 7.

Figure 3:
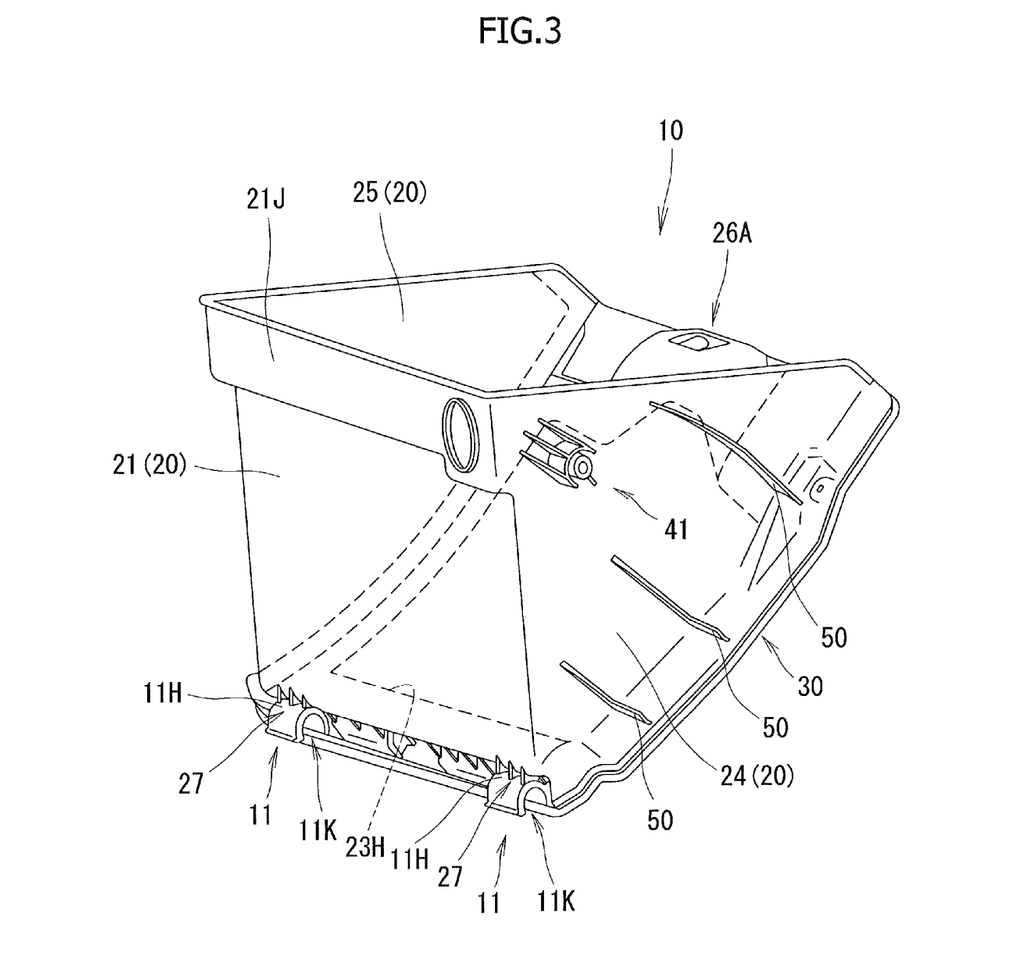
FIG. 3 is a perspective view of a glove box according to an embodiment of the present invention.
Figure 4:
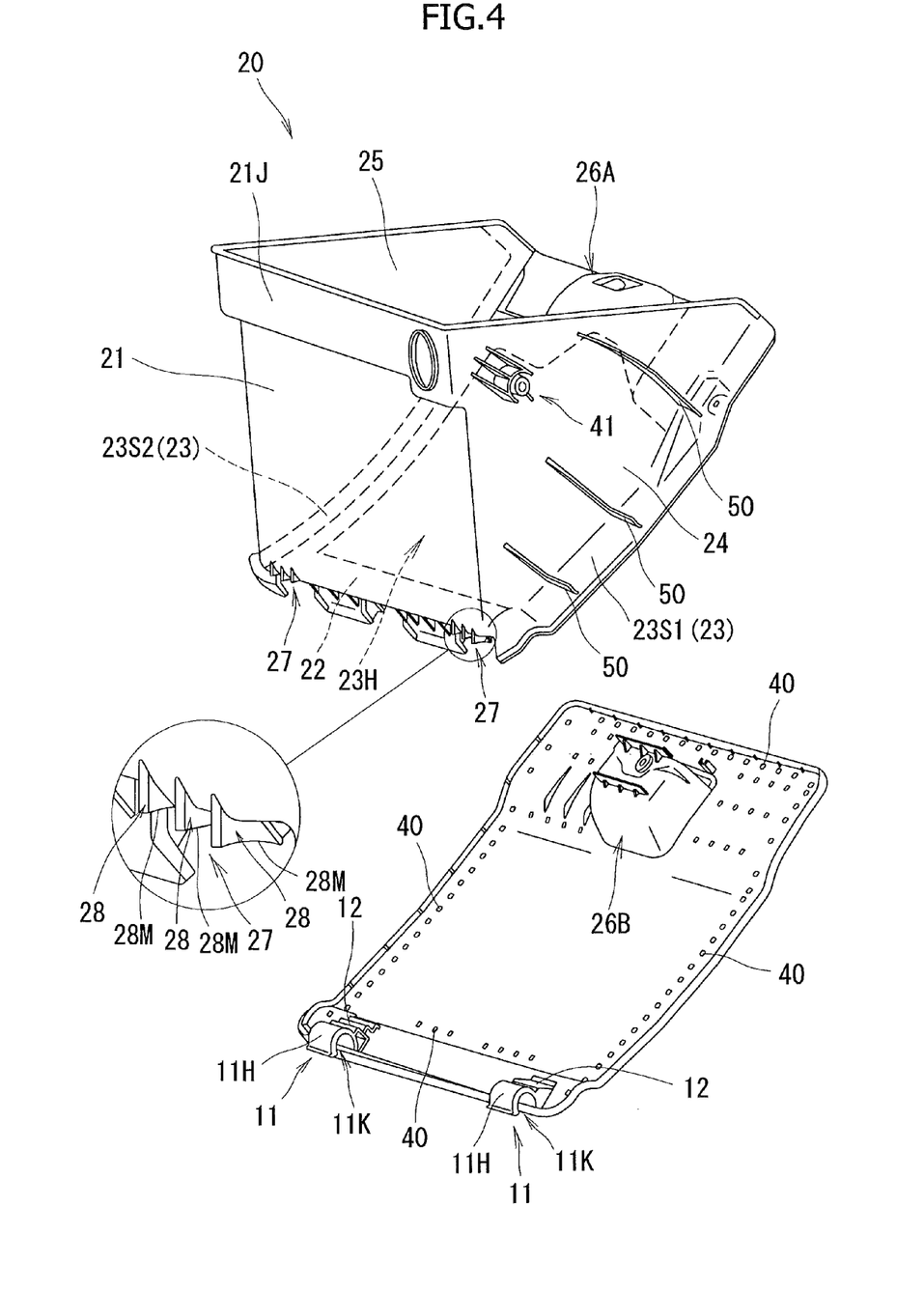
FIG. 4 is a perspective view of a glove box according to an embodiment of the present invention.

As illustrated in FIGS. 3 to 5, a pair of transversely arranged engaging portions 11 provided at the glove box 10 are pivotally engaged with the axle portions 7 so that the glove box 10 can swing with reference to an axis O of the axle portions 7 so as to be switchable between a closed state in which the glove box 10 is housed in the opening 4 of the instrument panel 1 and an opened state in which the glove box 10 projects from the opening 4 toward the interior space of the vehicle (i.e., the glove box 10 can freely be opened and closed).

The glove box 10 includes a box body 20 and a lid 30 attached to the box body 20, the lid 30 closing the opening 4 in the closed state. The box body 20 has a V-shape with its upper side opened in a vertical side cross section. The box body 20 includes a back wall 21 substantially extending along a vertical direction in the closed state, a bottom wall 22 which extends from a lower end portion of the back wall 21 toward the rear side of the vehicle, and has a short length in a fore-aft direction of the vehicle, an inclined wall 23 extending from an end of the bottom wall 22 on the rear side of the vehicle so as to form a substantial V-shape together with the back wall 21 in a vertical cross section, a left side wall 24 bridging between a left end portion of the back wall 21 and a left end portion of the inclined wall 23, and a right side wall 25 bridging between a right end portion of the back wall 21 and a right end portion of the inclined wall 23. Multiple reinforcing ribs 50 are provided on each of outer surfaces of the left and right side walls 24 and 25 and a back surface of the inclined wall 23.

An upper end portion 21J of the back wall 21 includes a stepped portion, and the upper end portion 21J is located further back of the opening 4 (i.e., closer to the front side of the vehicle) compared to the rest of the back wall 21.

A width of the inclined wall 23 (length of the inclined wall 23 in the width direction of the vehicle) is set to be longer than a distance between the pair of side walls 24 and 25, and thus, a left side portion 23S1 of the inclined wall 23 extends out from the left side of the left side wall 24, while a right side portion 23S2 of the inclined wall 23 extends out from the right side of the left side wall 24 (extends toward the lower front side in the fore-aft direction of the vehicle). The inclined wall 23 includes a large rectangular opening 23H at an inward portion in a width direction and a longitudinal direction thereof, and multiple ribs for welding to the lid 30 is provided at a portion around the opening 23H. As a result of the opening 23H being included in the inclined wall 23, the weight of the box body 20 can be reduced.

The lid 30 is attached to the inclined wall 23 of the box body 20 by means of welding in such a manner that the lid 30 is superimposed on the inclined wall 23 on the passenger's side (i.e., the rear side Rr of the vehicle) (instead of the welding, the lid 30 may be secured to the inclined wall 23 of the box body 20 by means of fastening via, e.g., screws). A front surface of the lid 30 is a design surface of the glove box 10. The lid 30 has a size that is substantially the same as that of the inclined wall 23 of the box body 20, and multiple small projections 40 for welding to be welded to the ribs for welding are provided on a back surface of the lid 30 (see FIG. 4). When the lid 30 is welded to the inclined wall 23 of the box body 20, the lid 30 forms a substantial V-shape in a vertical side cross section together with the back wall 21 of the box body 20.

A locking mechanism for locking the glove box 10 in the closed state at the peripheral edge portion of the opening 4 of the instrument panel 1 is provided between the box body 20 and the lid 30, and housing portions 26A and 26B for the lock mechanism for the glove box 10 are provided in such a manner that the housing portions 26A and 26B bulge out of a center in a transverse direction of an upper portion of the inclined wall 23 of the box body 20 and a center portion in a transverse direction of an upper portion of the lid 30.

A lower end portion 30K of the lid 30 extends up to a position below the bottom wall 22 of the box body 20. In other words, the lower end portion 30K of the lid 30 is arranged below the bottom wall 22.

As illustrated in FIG. 5, each engaging portion 11 has a C-shape with its lower side opened in a cross section in the closed state, and is provided on the back side (opposite to the design surface) of the lower end portion 30K of the lid 30. More specifically, a part of a peripheral portion of each engaging portion 11 on the rear side of the vehicle is connected to a back surface of the lower end portion 30K of the lid 30 via a corresponding connection piece 12 in an integrated manner. An open end 11T of the engaging portion 11 on the rear side of the vehicle is also connected to the back surface of the lower end portion 30K of the lid 30 in an integrated manner.

A pair of transversely arranged support portions 27 receiving and supporting the engaging portions 11 on the upper side of the engaging portions 11, which is opposite to the side of the engaging portions 11 in which a force applied from the axle portions 7 to the engaging portions 11 is exerted are provided at an outer surface of a corner portion C formed by the vertically-extending back wall 21 and the bottom wall 22 of the box body 20 in such a manner that the support portions 27 project from the outer surface.

Figure 6:
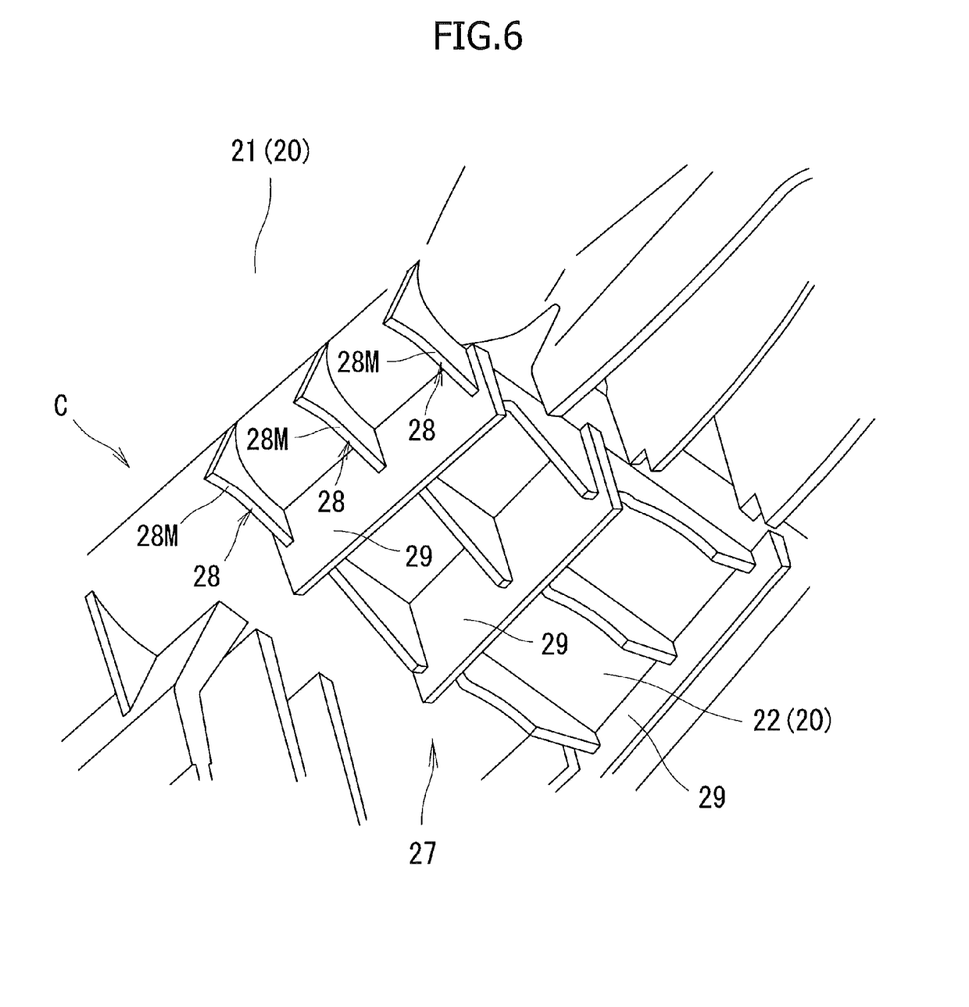
FIG. 6 is a perspective view of a support portion for an engaging portion according to an embodiment of the present invention, viewed from the bottom side.

As illustrated in FIGS. 4 to 6, each support portion 27 includes multiple first ribs 28 provided so as to project from the corner portion C and the outer surface of the bottom wall 22, the first ribs 28 being mutually spaced in a width direction of the box body 20 (corresponding to "ribs" in the claims), and multiple second ribs 29 provided so as to project from the corner portion C and the outer surface of the bottom wall 22, the second ribs 29 crossing the first ribs 28 (at right angles).

Each first rib 28 has a plate-like shape elongated in a direction orthogonal to the width direction of the box body 20, and each second rib 29 has a plate-like shape elongated in the width direction of the box body 20. Each second rib 29 is welded to at least one of the corresponding connection piece 12 and the lower end portion 30K of the lid 30. The portion in which the second rib 29 and the connection piece 12 overlap each other and the portion in which the second rib 29 and the lower end portion 30K of the lid 30 overlap each other in FIG. 5 are margins for welding. In the present embodiment, although each support portion 27 includes three first ribs 28 and three second ribs 29, each of the number of first ribs 28 and the number of second ribs 29 may be a number other than three.

A lower surface of an end of each first rib 28 located on the back side of the box body 20 includes a support surface 28M for receiving and supporting the corresponding engaging portion 11. The support surface 28M has a circular arc shape with a large radius of curvature, and receives and supports a back portion 11H of the engaging portion 11 on the side opposite to an open end 11K of the engaging portion 11 across an axis O of the engaging portion 11.

Since each support portion 27 includes a grid of the first ribs 28 and the second ribs 29 crossing the first ribs 28, the rigidity and strength of the support portion 27 can be enhanced. Furthermore, since each support surface 28M has a circular arc shape with a large radius of curvature, the support surface 28M can reliably receive and support the back portion 11H of the corresponding engaging portion 11, enabling provision of a stable support state.

In a state before the glove box 10 is assembled to the instrument panel 1, in which the engaging portions 11 is not engaged with the axle portions 7, the support portions 27 are spaced from the engaging portions 11 (see the line with alternating long dash and two short dashes (the support surface 28M) in the enlarged diagram in FIG. 5), and in a state after the article storage box is assembled to the instrument panel 1, in which the engaging portions 11 are engaged with the axle portions 7, the support portions 27 abut the at least one of the engaging portions 11 as a result of elastic deformation of the bottom wall 22 and the lower end portion 30K of the lid 30 due to the weight of the box body 20 itself (or possibly the weight of the box body 20 itself plus the load of an article stored therein). Consequently, interference between the support portions 27 and the engaging portions 11 in assembling the lid 30 and the box body 20 can be prevented, facilitating easy assembly and thus enhancing the assemblability.

A cylindrical engagement projection portion 41, which projects outward in the width direction of the glove box, is provided at an upper end portion on the back wall 21 side of each of the left side wall 24 and the right side wall 25. The engagement projection portions 41 are caught by end edges of the opening 4 of the instrument panel 1 to retain a fully opened state of the glove box 10. A cushioning material (not illustrated) is provided on each of the engagement projection portions 41.

The above-described structure provides the following effects.

(1) Since the engaging portions 11 are provided at the lid 30 and the first ribs 28 receiving and supporting the engaging portions 11 on the upper side of the engaging portions 11 opposite to the side of the engaging portions 11 on which a force applied from the axle portions 7 to the engaging portions 11 is exerted are provided at the box body 20, enabling the engaging portions 11 to be received and supported by the first ribs 28, the rigidity and strength of an engagement structure including the axle portions 7 and the engaging portions 11 can be enhanced, enabling enhancement of the durability of the engagement structure.

Furthermore, since the engaging portions 11 are provided at the lid 30 while the support portions 27 are provided at the box body 20, the structure of the lid 30 can be simplified compared to, for example, a structure in which the engaging portions 11 are provided with reinforcing portions such as ribs, enabling simplification of a mold for the lid 30 as well as reduction in the cost of the mold.

As described above, the rigidity and strength of the engagement structure can be enhanced, and thus, an increase in the size of the axle portions 7 can be avoided, enabling reduction in the size of the peripheral edge portion of the opening 4 of the instrument panel 1 at which the axle portions 7 are provided.

(2) The at least one of the weights of the box body 20 and the lid 30 themselves and the load of an article stored in the box body 20 is applied to the axle portions 7. Furthermore, an upward force is applied from the axle portions 7 to the engaging portions 11. The engaging portions 11 are received and supported by the support portions 27 each including the multiple first ribs 28 on the upper side of the engaging portions 11, thereby suppressing upward deformation and movement of the engaging portions 11.

The corner portion C formed by the vertically extending back wall 21 and the bottom wall 22 of the box body 20 has high rigidity and strength compared to the other portions of the box body 20. The first ribs 28 and the second ribs 29 are provided so as to project from the outer surface of such corner portion C with high rigidity and strength, and thus, the rigidity and strength of the support portions 27 each including the multiple first ribs 28 and the multiple second ribs 29 can be enhanced, enabling enhancement of the rigidity and strength of the engagement structure. Accordingly, the engaging portions 11 and the axle portions 7 can be made to resist deformation even when an article is stored in the box body 20 or when heat is applied to the box body 20.

(3) Since the engaging portions 11 each have a C-shape with its lower side opened in a cross section in the closed state, and the first ribs 28 receive and support the back portions 11K of the engaging portions 11 on the upper side of the engaging portions 11 opposite to the opened portions 11K of the engaging portions 11 across the axis O of the engaging portions 11, the structure of the engaging portions 11 can be simplified, enabling further simplification of the engagement structure. Furthermore, the axle portions 7 can be inserted into the open portions 11K of the engaging portion 11 to engage the engaging portions 11 with the axle portions 7, enabling the engagement work to be performed smoothly.

(4) Since the first ribs 28 and the second ribs 29 require only a small space, the reinforcing structure for the engagement structure can easily be arranged at a narrow and complex space such as a space around the lower side of the peripheral edge portion 4S of the opening 4 of the instrument panel 1. Furthermore, since the engaging portions 11 are supported by the first ribs 28, the mold for the box body 20 can have a simple shape.

Other Embodiments (1) The engaging portions 11 may be provided at the box body 20 and the support portion 27 may be provided at the lid 30.
(2) Although the above embodiment has been described taking the glove box 10 as an example, the present invention is applicable not only to the glove box 10, but also to any other storage box.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A box support structure for an instrument panel, in which an engaging portion provided at an article storage box pivotally engages with an axle portion provided at a peripheral edge portion of an opening of the instrument panel so that the article storage box can swing with reference to an axis of the axle portion so as to be switchable between a closed state in which the article storage box is housed in the opening and an opened state in which the article storage box projects from the opening, the article storage box including a box body and a lid attached to the box body, the lid closing the opening in the closed state, wherein:

the engaging portion is provided at one of the box body and the lid; and a support portion receiving and supporting the engaging portion on a side of the engaging portion opposite to a side of the engaging portion on which a force applied from the axle portion to the engaging portion is exerted is provided at the other of the box body and the lid.

2. The box support structure for an instrument panel according to claim 1, wherein:
the axle portion is provided on a lower side of the peripheral edge portion of the opening of the instrument panel, the axle portion having a transversely elongated shape extending along a width direction of a vehicle;
the box body includes a vertically extending back wall and a bottom wall;
a lower end portion of the lid is arranged below the bottom wall;
the engaging portion is provided at the lower end portion of the lid; and
the support portion is provided so as to project from an outer surface of a corner portion formed by the back wall and the bottom wall.

3. The box support structure for an instrument panel according to claim 2, wherein:
the engaging portion has a C-shape in a cross section; and
the support portion receives and supports a back portion of the engaging portion on a side of the engaging portion opposite to an open portion of the engaging portion across an axis of the engaging portion.

4. The box support structure for an instrument panel according to claim 2, wherein the support portion includes multiple ribs provided so as to project from the outer surface of the corner portion, the multiple ribs being mutually spaced in a width direction of the box body.

5. The box support structure for an instrument panel according to claim 2, wherein:
the support portion is spaced from the engaging portion in a state before the article storage box is assembled to the instrument panel, in which the engaging portion is not engaged with the axle portion; and
the support portion abuts the engaging portion via a weight of the box body itself, or the weight of the box body itself plus a load of an article stored therein in a state after the article storage box is assembled to the instrument panel, in which the engaging portion is engaged with the axle portion.

* * * * *